United States Patent [19]
Hill et al.

[11] Patent Number: 5,206,816
[45] Date of Patent: Apr. 27, 1993

[54] SYSTEM AND METHOD FOR MONITORING SYNCHRONOUS BLADE VIBRATION

[75] Inventors: Peter D. Hill, Monroeville; Francis S. McKendree, Penn Hills; Charles W. Einolf, Jr., Murrysville, all of Pa.; Paul F. Rozelle, Fern Park; Roger W. Heinig, Cocoa Beach, both of Fla.

[73] Assignee: Westinghouse Electric Corp., Pittsburgh, Pa.

[21] Appl. No.: 647,906

[22] Filed: Jan. 30, 1991

[51] Int. Cl.$^5$ .................. G01M 1/22; G01H 11/00
[52] U.S. Cl. ..................... 364/508; 73/660; 364/551.01
[58] Field of Search ............ 364/508, 507, 463, 565, 364/550.01; 73/573, 654, 660

[56] References Cited

U.S. PATENT DOCUMENTS

| | | | |
|---|---|---|---|
| 3,467,358 | 9/1969 | Zablotsky et al. | 253/77 |
| 4,153,388 | 5/1979 | Naegeli et al. | 416/61 |
| 4,413,519 | 11/1983 | Bannister et al. | 73/660 |
| 4,422,333 | 12/1983 | Leon | 73/660 |
| 4,507,658 | 3/1985 | Keating | 343/12 |
| 4,518,917 | 5/1985 | Oates et al. | 73/660 X |
| 4,573,358 | 3/1986 | Luongo | 73/660 |
| 4,593,566 | 6/1986 | Ellis | 73/660 |
| 4,683,542 | 7/1987 | Taniguti | 364/508 |
| 4,689,993 | 9/1987 | Slettemoen | 73/660 X |
| 4,885,707 | 12/1989 | Nichol et al. | 364/551.01 |
| 4,887,468 | 12/1989 | McKendree et al. | 73/660 |
| 4,896,537 | 1/1990 | Osborne | 73/660 |
| 4,907,456 | 3/1990 | Roszelle | 73/660 |
| 4,937,758 | 6/1990 | Hayden et al. | 364/508 |

OTHER PUBLICATIONS

M. Rettinger, "Small Music Rooms," Audio (Oct., 1968), pp. 25 and 87.
O. Bonello, "Letter to the Editor," Journal of the Audio Engineering Society, vol. 30, No. 6 (Jun., 1982).
C. L. S. Gilford, "The Acoustic Design of Talks Studios And Listening Rooms," Journal of Audio Engineering Society, vol. 27, No. ½ (Jan./Feb., 1979), pp. 17-31.

Primary Examiner—Parshotam S. Lall
Assistant Examiner—Collin W. Park

[57] ABSTRACT

A system and method are provided for monitoring synchronous blade vibration in a turbo-machine. At least three sensors capable of detecting the arrival of each blade are arranged about the cylinder which surrounds the tips of the blades. The location of the sensors is selected to minimize the influence of errors in the data. To this end, and to simplify the installation of the sensors into the cylinder, the sensors may be non-uniformly spaced. The location of each sensor for purposes of constructing Fourier transforms is determined using the arrival times at the blades at each sensor, expressed as a fraction of a rotor revolution. The transform matrix is constructed for a predetermined discrete set of M harmonics, so that M harmonics are analyzed simultaneously, the number of harmonics which can be simultaneously analyzed is related to the number of sensors used. The blade arrival time data at each sensor, expressed as a fraction of a rotor revolution, is analyzed to determine the amplitude of the blade vibration at each of the harmonics selected for the set. The calculations are repeated for a variety of harmonic sets in order to accurately interpret the results in the event there is significant vibration at harmonics not included in the initial set.

25 Claims, 8 Drawing Sheets

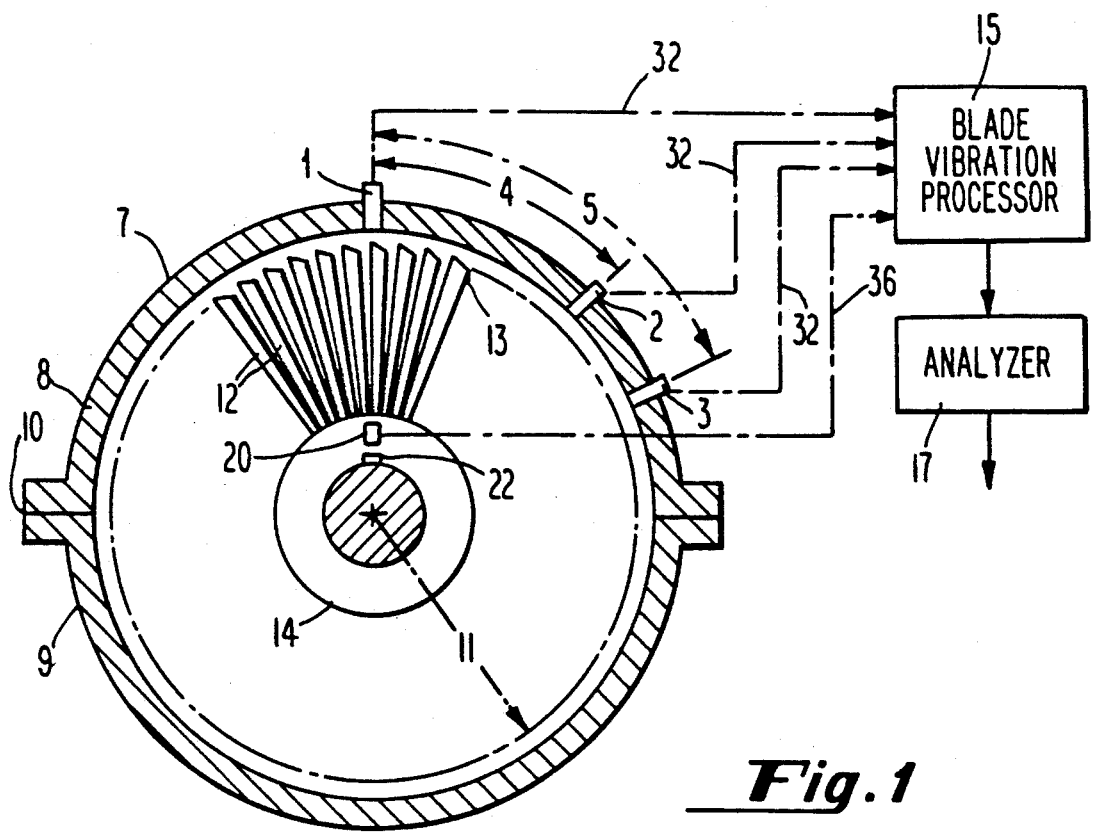
_Fig.1_
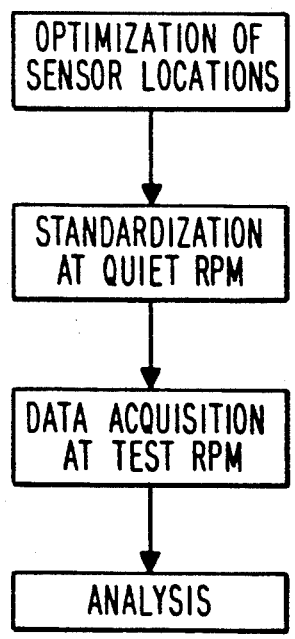
_Fig.4_

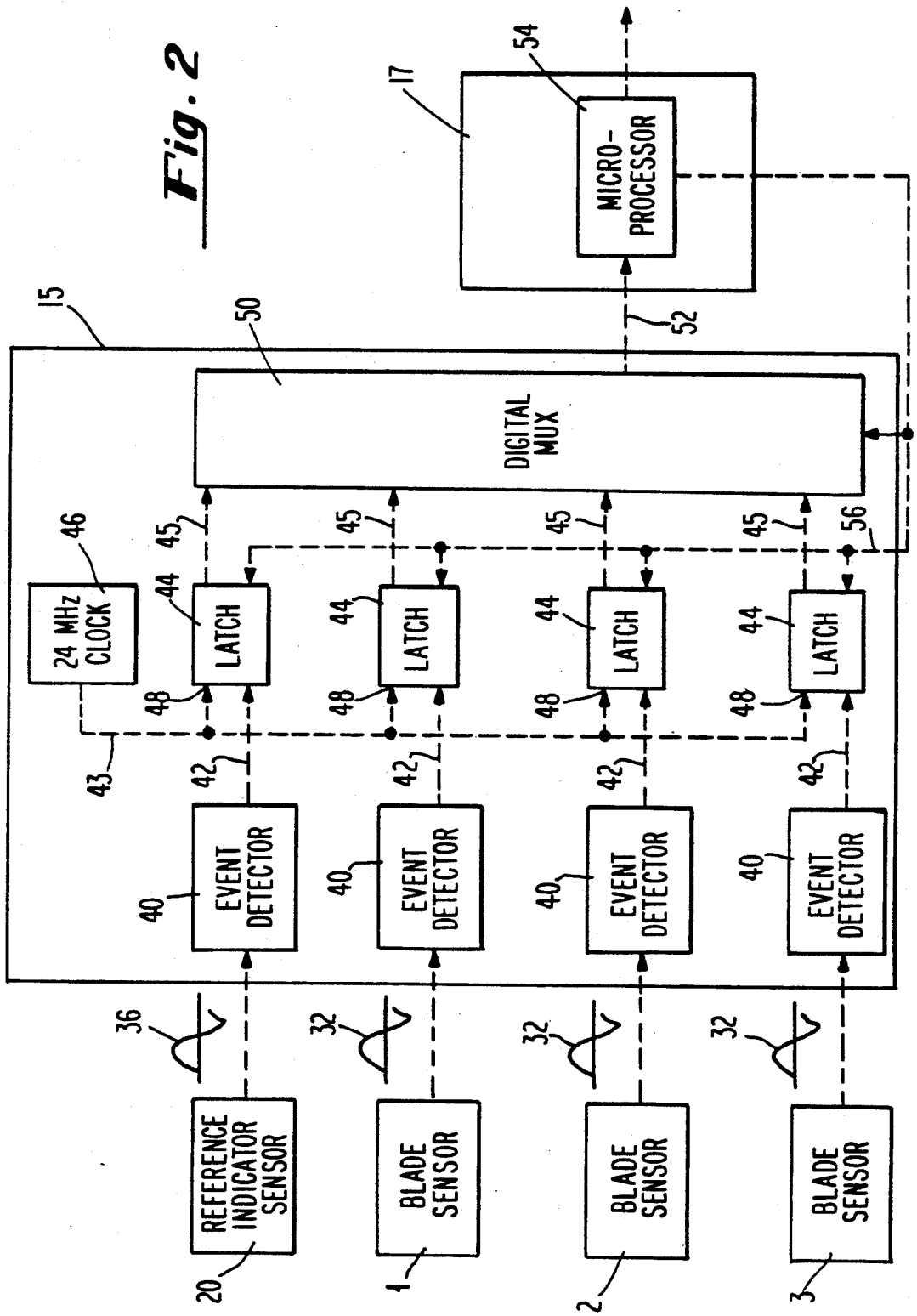

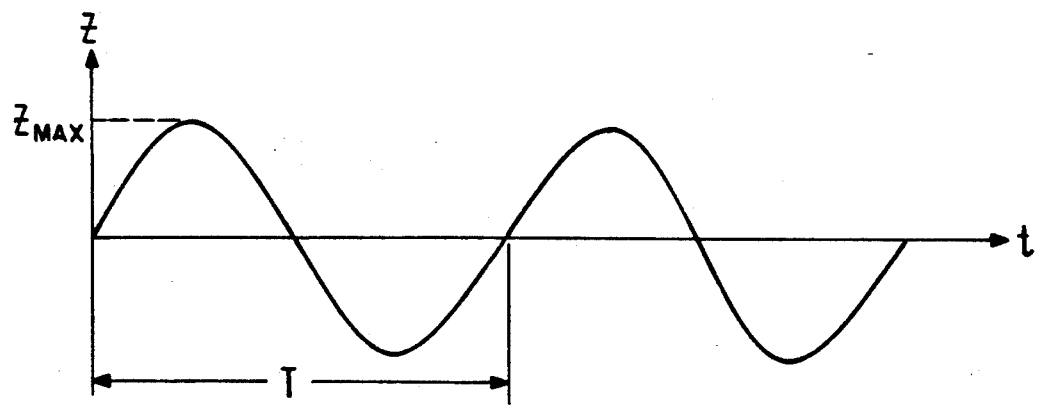
(a)
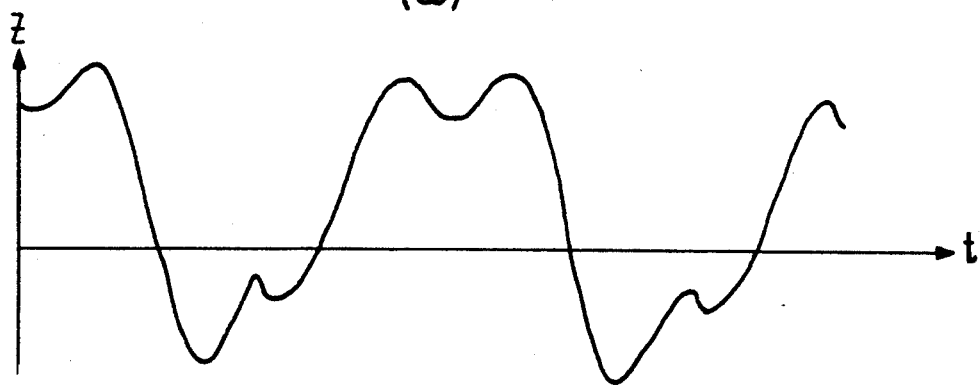
(b)
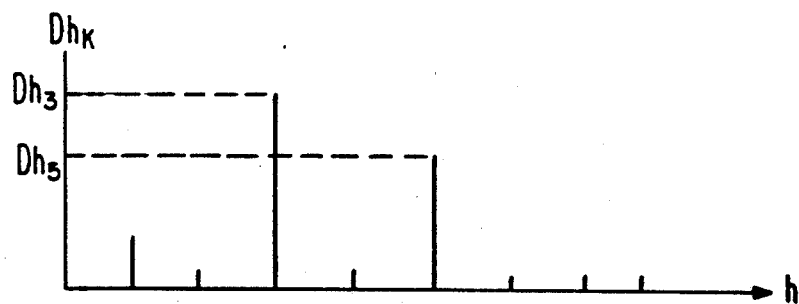
(c)
Fig. 3

SYSTEM AND METHOD FOR MONITORING SYNCHRONOUS BLADE VIBRATION

The current invention relates to a system and method for monitoring blade vibration on the rotor of a turbo-machine. More specifically, the current invention relates to monitoring synchronous blade vibration in a steam turbine or gas turbine.

During operation of a turbo-machine, the rotating blades are subject to vibration at frequencies which coincide with integer multiples, referred to as harmonics, of the rotor rotational frequency. Such vibration is referred to as synchronous vibration. Synchronous blade vibration can be excited by non-uniformities in the flow of the motive fluid which may vary in space around the circumference of the turbo-machine. Such non-uniformities result from the presence of (i) such features as extraction pipes and reinforcing ribs, and (ii) imperfections in the shape and spacing of the stationary blades. In turbo-machines which are intended to operate at or very near a single rotational frequency, the rotating blades are often designed such that one or more of their natural frequencies do not coincide with harmonics of rotor rotational frequency.

During operation of a turbo-machine, the rotating blades are also subject to vibration at frequencies which do not coincide with harmonics of rotor rotational frequency. Such vibration is referred to as non-synchronous vibration. Non-synchronous blade vibration can be excited by non-uniformities in the flow of the motive fluid which may vary with time, most typically as a result of (i) random turbulence in the flow or (ii) variations in flow which result from interactions with the vibratory motion of the blade. The latter is referred to as self-excited vibration. Non-synchronous blade vibration can also be excited by axial or torsional vibration of the rotor. Such vibration may be associated with resonance of the rotor system.

One method of monitoring non-synchronous vibration is disclosed in U.S. Pat. No. 4,887,468, granted to McKendree and Rozelle and assigned to the same assignee as the current invention, which is hereby incorporated by reference. According to this approach, a maximum of two stationary sensors are installed at the periphery of the rotating blades. The sensors measure the arrival time of each blade-tip at the sensor location. The blade-tip deflection due to vibration is determined from the deviation in the actual blade arrival time from the expected blade arrival time. A conventional Fourier analysis may be performed to determine the amplitude of the components of vibration at each frequency, as explained therein. Although that system detects the presence of synchronous vibration, two probes do not provide sufficient data to discriminate among the various integral harmonics which may be present.

As disclosed in U.S. Pat. No. 4,573,358, assigned to the same assignee as the current invention, complete amplitude and phase information can be obtained with a large array of equally-spaced sensors. In this case, vibrational harmonics up to one-half the number of sensors can be discriminated. Higher harmonics are also detected, but appear as responses at lower harmonics. The phenomenon of a higher harmonic appearing as a lower harmonic is known as aliasing.

It is desirable to reduce the number of sensors to less than the number required for such complete information. This is so because in a turbo-machine installation, there is usually sufficient access for sensors at only a limited number of locations on the cylinder enclosing the blades. Moreover, in existing turbines, installing sensors in the base half of the cylinder requires removal of the rotor, thereby significantly complicating installation. The situation is further complicated by the fact that traditional Fourier analysis methods are adapted for use only with data obtained at uniform sampling rates. As a result, the sensors must be uniformly spaced about the circumference of the cylinder. (Note that, as used herein the term uniform sensor spacing means a spacing between each sensor which is equal to 360° divided by the number of sensors.) However, uniform spacing is difficult to achieve due to the presence of pipes and supports.

Consequently, it would be desirable to provide a system and method for monitoring synchronous blade vibration in a turbo-machine using a limited quantity of probes which may be non-uniformly spaced.

SUMMARY OF THE INVENTION

It is the object of the current invention to provide a system and method for monitoring synchronous blade vibration in a turbo-machine, such as a steam turbine or gas turbine.

It is another object of the current invention to determine an optimum set of sensor locations so as to minimize the effects of errors in the data on the calculated vibration amplitude.

It is still another object of the invention to enable accurate Fourier analysis of data obtained from non-uniformly spaced sensors.

These and other objects are accomplished in a turbo-machine having one or more rows of rotating blades and a blade vibration monitoring system for monitoring the components of blade vibration at frequencies which are harmonics of the rotor rotational frequency. The blade vibration monitoring system features (i) at least three stationary sensors, circumferentially arranged around a row of rotating blades, for generating a signal whenever one of the blades arrives at one of the sensor locations, the spacing between the sensors not being limited to uniform spacing, (ii) means, responsive to the sensor signals, for generating data representative of the actual arrival time of the blades at each of the sensor locations, (iii) means for generating data representative of the expected arrival time of each of the blades at each of the sensor locations, (iv) means for determining the deviation between the actual and expected arrival times of each of the blades at each of the sensor locations, and (v) means for determining the harmonic components of vibration for each of the blades from the aforementioned deviations, the components determined being those at frequencies equal to harmonics from a selected set of harmonics, the number of harmonics in each of the sets being related to the number of sensors utilized.

The current invention is also directed to a method of detecting vibration in the blades of a turbo-machine. This method includes the steps of (i) arranging a stationary set of first sensors circumferentially around the rotor, (ii) determining the angular location of each of the first sensors relative to a second sensor, (iii) selecting a set of harmonics, the number of harmonics in the set being related to the number of first sensors utilized, (iv) determining the Fourier transform matrix for the set of first sensors using the angular locations as determined above and the aforementioned set of harmonics, (v) rotating the rotor at a substantially constant speed and sensing the arrival of each of the blades at each of the first sensor locations relative to the arrival time of the reference indicator at a second sensor location, and (vi) forming a set of arrival time data into a vector and multiplying by said Fourier transform matrix to arrive at a blade-tip displacement vector.

BRIEF DESCRIPTION OF THE DRAWINGS

FIG. 1 is a cross-section through a turbo-machine showing a row of rotating blades and the synchronous blade vibration monitoring system according to the current invention.

FIG. 2 shows the details of the blade vibration processor of FIG. 1.

FIGS. 3 (a) and (b) show typical blade-tip deflection waveforms in the time domain, (c) shows the results of a Fourier analysis of a blade-tip deflection waveform comprised of vibration at the third and fifth harmonics.

FIG. 4 is a flowchart showing the overall method for monitoring vibration according to the current invention.

DESCRIPTION OF THE PREFERRED EMBODIMENT

I. Theory

Figure 5:
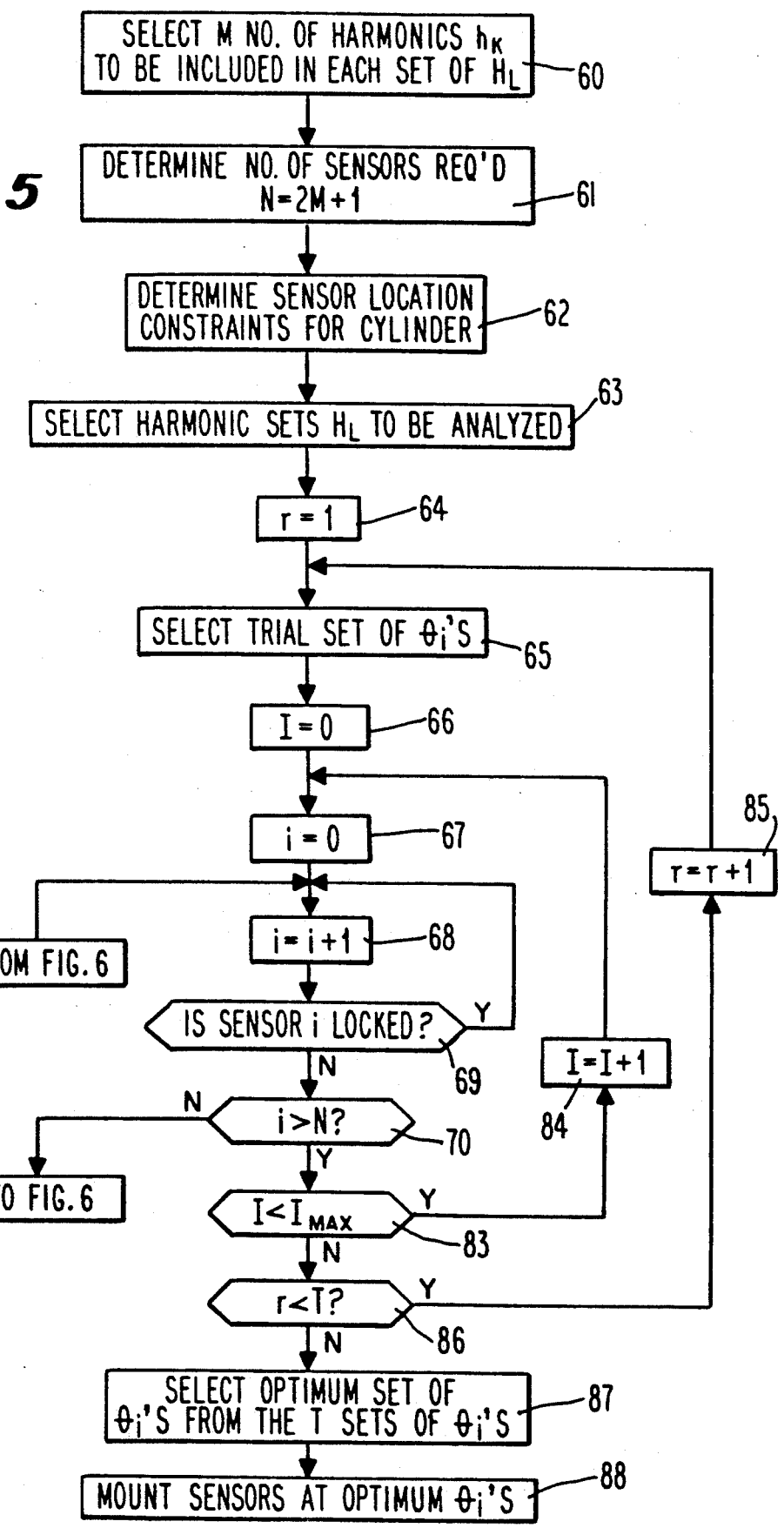
FIGS. 5-9 are flowcharts showing the steps in the blade sensor location optimization phase, standardization phase, data acquisition phase, and analysis phase, shown in FIG. 4.

There is shown in FIG. 1, a cross-section through a turbo-machine, such as a steam turbine, or the turbine or compressor section of a gas turbine. As shown in FIG. 1, a housing 7, typically referred to as a cylinder, encloses a rotor 16 having one or more discs 14. A plurality of blades 12 are arranged in a row about the periphery of the rotor disc 14. In many cases, there may be over 100 blades in a row. The tip 13 of each blade 12 sweeps past the inner surface of the cylinder 7 and describes a circle of radius 11.

In addition to its angular velocity due to rotor rotation, each blade-tip undergoes oscillating deflection due to blade vibration. FIGS. 3(a) and (b) show two traces of the deflection of the blade-tip from its neutral position as a function of time. FIG. 3(a) depicts the blade-tip deflection when the blade is vibrating with a maximum amplitude Zmax at a single frequency, so that the waveform is that of a pure sinusoid. If the period T of the waveform equals the period of time required for a complete revolution of the rotor—that is, if the frequency of the blade vibration equals the frequency of rotor rotation—then the blade is said to be vibrating at the first harmonic (h=1) of rotor rotational frequency. In an electrical power plant, one common rotor rotational frequency is 60 Hz. In vibration monitoring, it is important to determine the maximum amplitude Zmax of the blade-tip deflection since it is indicative of the vibratory stress in the blade.

Very often, turbine blades are simultaneously vibrating at several frequencies. This results in the complex blade-tip deflection waveform shown in FIG. 3(b). As is well known, such complex waveforms can be approximated by a series of sinusoids in a Fourier series:

$$Z = d_1\sin(\theta) + d_2\cos(\theta) + d_3\sin(2\theta) + d_4\cos(2\theta) + \ldots + \quad (1)$$

$$d_{2R-1}\sin(R\theta) + d_{2R}\cos(R\theta) + d_{2R+1}$$

where:
$Z$ = amplitude of blade-tip deflection.
$d_p$ = amplitude of each sine and cosine component, odd values of p are for the sine components and even values are for the cosine components.
$\theta = 2\pi t/T$.
$d_{2R+1}$ = static deflection of the blade-tip.

Using summation notation, equation (1) becomes:

$$Z = \sum_{k=1}^{R} [d_{2k-1}\sin(k\theta) + d_{2k}\cos(k\theta)] + d_{2R+1} \quad (2)$$

where
$k$ = the harmonic of the blade frequency.

The maximum amplitude $Dh_k$ of the tip deflection associated with the vibratory component at any particular harmonic $h_k$ is:

$$Dh_k = [d_{2k-1}^2 + d_{2k}^2]^{1/2} \quad (3)$$

A Fourier analysis waveform in the time domain, such as that shown in FIG. 3(b), is transformed into its representation in the frequency domain, such as that shown in FIG. 3(c). The data shown in FIG. 3(c) indicates a blade-tip deflection waveform which is primarily the result of a composite of blade vibration at the third and fifth harmonics. In the case of a rotor operating at 60 Hz, this would mean that the blade was vibrating at frequencies of 180 Hz and 300 Hz. The values for $Dh_3$ and $Dh_5$ shown in FIG. 3(c) represent the amplitude of the component of blade vibration at the third and fifth harmonic frequencies, respectively.

As discussed in aforementioned U.S. Pat. No. 4,887,468, information on blade vibration can be obtained by measuring the arrival time of the blade-tip at a set of first sensors relative to the arrival time of a rotor reference indicator at a second sensor, the first and second sensors being located on the cylinder. FIG. 1 shows blade sensors 1,2,3, a rotor reference indicator 22, and a reference indicator sensor 20, according to the current invention.

If there were no blade vibration, the blade arrival time at each sensor would be a function solely of rotor speed and the geometry of the components—specifically, (i) the angle on the rotor 16 between the blade-tip 13 under scrutiny and reference indicator 22 and (ii) the angle on the cylinder 7 between each blade sensor 1,2,3 and the reference indicator sensor 20. The blade arrival time in the absence of blade vibration is referred to as the expected blade arrival time. Blade vibration will cause a deviation $\Delta t$ in the actual blade arrival time from the expected blade arrival time. When the blade-tip is in the portion of its oscillatory cycle which is in the direction of rotor rotation, the arrival time will be shorter then expected, whereas when the blade-tip displacement is in the direction opposite to the rotor rotation, the arrival time will be longer then expected. Thus, determining the deviation $\Delta t$ in the actual blade arrival time from the expected arrival time yields information on the blade-tip deflection. Specifically, the amplitude Z of the blade tip deflection as the blade passes a sensor is related to the deviation $\Delta t$ the expected arrival time by the equation:

$$Z = (1/\alpha)\Delta t \quad (4)$$

where:
$\alpha = \text{Trev}/2\pi R$.

Trev = the time for one complete rotor revolution.

By sampling blade-tip deflection data a number of times each rotor revolution, as explained below, information on the blade vibration amplitude at each harmonic frequency may be obtained.

The location of each blade sensor 1,2,3 may be defined by the angle $\theta_i$ between its location and the location of the reference indicator sensor 20. In FIG. 1, the angle of sensor 1 is 0° and the angles of sensors 2 and 3 are shown by reference numerals 4 and 5, respectively. From equation (4), it can be seen that the deviation in the arrival time $\Delta t$ of the blade at the i-th sensor is related to the displacement A of the blade-tip as it passes the sensor, so that:

$$\Delta t_i = \alpha Z_i \quad (5)$$

Substituting equation (2) into (5) yields a Fourier series expression for the deviation in arrival time based on the harmonic components $d_p$ of the blade vibration:

$$\Delta t_i = \alpha \left\{ \sum_{k=1}^{N} [d_{2k-1}\sin(k\theta_i) + d_{2k}\cos(k\theta_i)] + d_{2N+1} \right\} \quad (6)$$

For reasons discussed below, according to the current invention, the vibration analysis is carried out for only a discrete set H of M harmonics $H = (h_1, h_2, \ldots h_M)$, so that equation (6) becomes:

$$\Delta t_i = \alpha \left\{ \sum_{k=1}^{M} [d_{2k-1}\sin(h_k\theta_i) + d_{2k}\cos(h_k\theta_i)] + d_{2M+1} \right\} \quad (7)$$

If there are N sensors, equation (7) can be expanded into matrix form as:

$$\begin{bmatrix} \Delta t_1 \\ \Delta t_2 \\ \cdot \\ \cdot \\ \cdot \\ \Delta t_N \end{bmatrix} = \alpha \begin{bmatrix} \sin(h_1\theta_1) & \cos(h_1\theta_1) & \ldots & \sin(h_M\theta_1) & \cos(h_M\theta_1) & 1 \\ \sin(h_1\theta_2) & \cos(h_1\theta_2) & \ldots & \sin(h_M\theta_2) & \cos(h_M\theta_2) & 1 \\ \cdot & \cdot & & \cdot & \cdot & \cdot \\ \cdot & \cdot & & \cdot & \cdot & \cdot \\ \cdot & \cdot & & \cdot & \cdot & \cdot \\ \sin(h_1\theta_N) & \cos(h_1\theta_N) & \ldots & \sin(h_M\theta_N) & \cos(h_M\theta_N) & 1 \end{bmatrix} \begin{bmatrix} d_1 \\ d_2 \\ \cdot \\ \cdot \\ \cdot \\ d_{2M+1} \end{bmatrix} \quad (8)$$

In compact notation equation (8) can be expressed as:
$$\Delta T = [A] D \quad (9)$$
where:
$a_{ij}$ = the elements of the [A] matrix $$a_{ij} = \begin{cases} \sin(k_k\theta_i) & \text{for } j = 1, 3, 5 \ldots 2M - 1 \\ \cos(h_k\theta_i) & \text{for } j = 2, 4, 6 \ldots 2M \\ 1 & \text{for } j = 2M + 1 \end{cases}$$

$k = [(j-1)/2] + 1$, truncated to integer values.

It should be noted that [A] is the discrete Fourier transform matrix for transforming the blade-tip deflection data from a frequency domain, comprised of the harmonics $h_k$ in a set H, into the time domain. Equation (9) can be solved for the amplitude of the harmonic components $d_p$ if the inverse $[A]^{-1}$ of the [A] matrix exists. According to a well known mathematical principle, $[A]^{-1}$ will exist only if [A] is a square matrix and the columns of [A] are linearly independent. Thus, the number of sensors N is related to the quantity M of harmonics $h_k$ in the set H by the equation $N = 2M + 1$ or $M = (N-1)/2$. If this condition is satisfied then equation (9) can be solved for D (the amplitude of harmonic components $Dh_k$ being the elements of the D vector), as follows:

$$D = (1/\alpha)[A]^{-1}\Delta T \quad (10)$$

It should be noted that $[A]^{-1}$ is the discrete Fourier transform matrix for transforming time domain data sampled at the sensor locations into a frequency domain comprised of the harmonics $h_k$ in set H. The inversion of the [A] matrix may be accomplished by any one of a number of well known techniques, such as the Lower-Upper triangularization method with partial pivoting.

According to an important aspect of the current invention, the sensors may be non-uniformly spaced around the cylinder 7, as shown in FIG. 1. This feature yields three significant advantages over prior art vibration monitoring systems which require uniformly spaced sensors in order to perform a Fourier analysis. First, sensors can be readily mounted in any area of the cylinder in which there is sufficient access. Hence, the presence of obstructions which preclude sensor installation in certain areas of a cylinder is not fatal. Moreover, according to the current invention, it is possible to restrict sensor locations to only the cover half 8 of the cylinder 7. This greatly facilitates retrofitting the apparatus into an existing turbo-machine, since installation in base half 9 of the cylinder 7 requires removal of the rotor 16.

Second, malfunction of a single sensor results in the loss of data from that sensor only. In prior art systems which require uniform sensor spacing, malfunction of a single sensor requires ignoring the data from a portion of the remaining sensors so as to maintain uniform data sampling——for example, if six sensors were being utilized and sensor number 2 malfunctioned, the data from sensors number 4 and 6 must be ignored.

Third, if one is analyzing for harmonics and the sensors are uniformly spaced, inevitable errors due to noise, quantization errors, etc., will strongly influence the results since such errors will give rise to an apparent low order harmonic vibration component. This occurs because the errors are being introduced at multiples of rotor rotation, which is the same aspect of vibration that is being analyzed. Hence, according to an important aspect of the current invention, the sensor locations are optimized to minimize the extent to which variance in the blade arrival time data $\Delta t$ due to noise and quantification errors propagates through equation (10) into the ultimate values for vibration amplitude $d_p$, as explained below. It can be shown that the variance in the harmonic amplitude data is related to the variance in the arrival time data, such variance being primarily the result of zero-mean Gaussian errors with a variance of $\sigma t$ in the blade passing times, by the following equation:

$$\sigma d_i^2 = (\sigma t/\alpha)^2 \sum_{j=1}^{N} (b_{ij})^2 \qquad (11)$$

where:

$\sigma d_{i2}$ = variance in the amplitude for the $i^{th}$ vibratory harmonic.

$\sigma t^2$ = variance in arrival time data for all the blades in the row at the $i^{th}$ sensor.

$b_{ij}$ = the elements of the $[A]^{-1}$ matrix.

Since the objective is to minimize the effect of variance in the data from each of N sensors on the final result, a performance criterion can be defined as follows:

$$P = \sum_{i=1}^{N} \sigma d_i^2 \qquad (12)$$

Substituting equation (11) into equation (12) and dropping out the $\sigma t^2$ and $\alpha$ terms, since they are not functions of sensor position, the performance criterion for an analysis performed on S harmonic sets can be defined as:

$$P = \sum_{k=1}^{S} \sum_{i=1}^{N} \sum_{j=1}^{N} [b_{ij}(k)]^2 \qquad (13)$$

Thus, the effect of variance in the blade arrival time data on the harmonic amplitude data is minimized by minimizing the sum of the squares of the elements $b_{ij}$ of the $[A]^{-1}$ matrices for each of the S harmonic sets H. The values of $b_{ij}(k)$ which will result in a minimum value of P can be determined by an iterative gradient search procedure. Such procedure can be represented by the equation:

$$\theta_{k+1} = \theta_k + \gamma(-\Gamma_k)$$

where:

k = the step or iteration number
$\gamma$ = the convergence factor
$\Gamma_k$ = the gradient at $\theta = \theta_k$ It can be shown that in this application, $\Gamma_k = \delta P/\delta \theta_i$. Thus, the set of angles $\theta_i$ for the sensors which results in the elements $b_{ij}(k)$ of the $[A]^{-1}$ matrices yielding a minimum value of P can be determined from:

$$\theta_i = \theta_i - \gamma(\delta P/\delta \theta_i) \qquad (14)$$

The inventors have found that 1.0 is a suitable value for $\gamma$.

The application of the gradient search procedure to equation (14) may be accomplished by determining $\delta P/\delta \theta_i$ analytically. However, since such analytical solutions are extremely difficult, especially if N is large, the value of the gradient $\delta P/\delta \theta_i$ may be approximated using a finite difference technique given by:

$$\delta P/\delta \theta_i = [(P(\theta_i + \epsilon) - P(\theta_i)]/\epsilon \qquad (15)$$

The inventors have found that 0.05 is a suitable value for $\epsilon$. Moreover, since the value of the gradient thus approximated can become very large (i.e., greater than 40°), causing the convergence process to become unstable, the inventors have found it advisable to constrain the magnitude of the gradient to 0.1.

The gradient search technique is performed on equation (14) for each sensor i = 1,2,3, ... N, subject to the aforementioned constraints due to limited accessibility over certain areas of the cylinder (i.e., over certain ranges of $\theta$), until the results converge on a stable solution. This solution yields an optimum set of blade sensor locations—that is, the set of values of $\theta_i$ which will result in a set of $[A]^{-1}$ matrices having elements $b_{ij}(k)$ which yield a minimum Variance in the harmonic component amplitude data given a variance in blade arrival time data.

II. Application

Relying upon the theoretical framework discussed above, the current invention is practiced as follows, reference being made to the system shown in the FIGS. 1 and 2 and the flowcharts shown in FIGS. 4–9.

There is shown in FIG. 1, a blade vibration monitoring system comprised of blade-tip sensors 1,2,3, reference sensor 20, reference indicator 22, a blade vibration processor 15 and an analyzer 17. Three blade-tip sensors are shown in FIG. 1 because, as explained below, this is the minimum number of sensors which may be used according to the current invention. However, it is understood that more than three sensors may be utilized.

In the preferred embodiment, the sensors are of the eddy current type. However, the invention may be practiced using any suitable method of sensing a blade passing event including, but not limited to, microwave or optical methods. Sensors 1,2,3 are mounted in the cylinder 7 and are circumferentially arranged around the row of blades 12. The magnetic flux in each sensor increases to a maximum as the blade-tip passes the sensor. The sensor output voltage 32, shown in FIG. 2, is the time derivative of this flux and is a waveform whose zero crossing occurs at the instant the blade-tip passes the sensor. Sensor 20 is affixed to the cylinder 7 as well, although not ordinarily in the same plane as the row of blades. A reference indicator 22 is formed on the rotor 16 and serves as a indexing means, whereby each blade can be identified by reference to its location relative to the reference indicator 22. In addition, reference indicator 22 causes sensor 20 to generate a similar output signal 36. The zero crossing of the sensor output 36 at the instance the reference indicator 22 passes sensor 20 causes the once per revolution (OPR) event. Thus, by detecting the blade passing and OPR events, as indicated by the zero crossing of the sensor outputs 32 and 36, respectively, the elapsed time between the OPR event and the arrival of each blade-tip 13 at each of the sensors 1,2,3, can be determined. This elapsed time is referred to as the blade arrival time.

As shown in FIG. 1, the output 32 and 36 from the sensors 1,2,3 and 20 are input into the blade vibration processor 15. As shown in FIG. 2, in the blade vibration processor 15, the signals 32 and 36 are input into event detectors 40 which produce output pulses in response to blade passing events. Suitable circuitry for producing output pulses in response to blade-passing events is known—see, for example, U.S. Pat. No. 4,593,566, which is hereby incorporated by a reference. Signal 36 from the reference sensor 20 is input to a fourth event detector 40. Signals 42 from the event detectors 40 indicate the passing of a blade 13 (in the case of blade sensor signals 32) and the detection of the reference indicator 22 (in the case of reference sensor 20) and are each input into a latch 44.

A 24 MHz clock 46, or a clock of other suitable frequency, provides a clock signal 43 input at a clock input terminal 48 of each of the latches 44. The signal 42 generated by each of the event detectors 40 causes the latch 44 driven by the particular signal 42 to store the current clock time which is found at clock input 48. Thus, signals 45, available at outputs of each of the latches 44, represent the time when a blade 12 passed sensors 1,2 or 3 or the reference indicator 22 passed sensor 20. Although only four event detectors 40 and latches 44 are shown in FIG. 2, additional detectors and latches would be required if additional blade sensors were utilized.

A digital multiplexer 50 multiplexes signals 45 from each of the latches 44 and provides a digitally multiplexed signal 52 to microprocessor 54. The microprocessor 54, through control line 56, controls the data flow through the multiplexer 50 and provides reset capabilities for the latches 44.

Using signals 45 the microprocessor 54 calculates the arrival time $tm_i$ of each blade at each blade sensor, relative to the time TOPR of the OPR event. Also, by determining the difference between successive measurements of TOPR, the microprocessor 54 calculates the elapsed time Trev required for one complete rotor revolution, which is the inverse of the rotational frequency of the rotor. In addition, the microprocessor 54 performs other calculations as discussed below.

As shown in FIG. 4, the method of using the system shown in FIGS. 1 and 2 is accomplished in four primary phrases—optimization of sensor locations, standardization at a quiet RPM, data acquisition at a test RPM, and analysis of the data.

Figure 6:
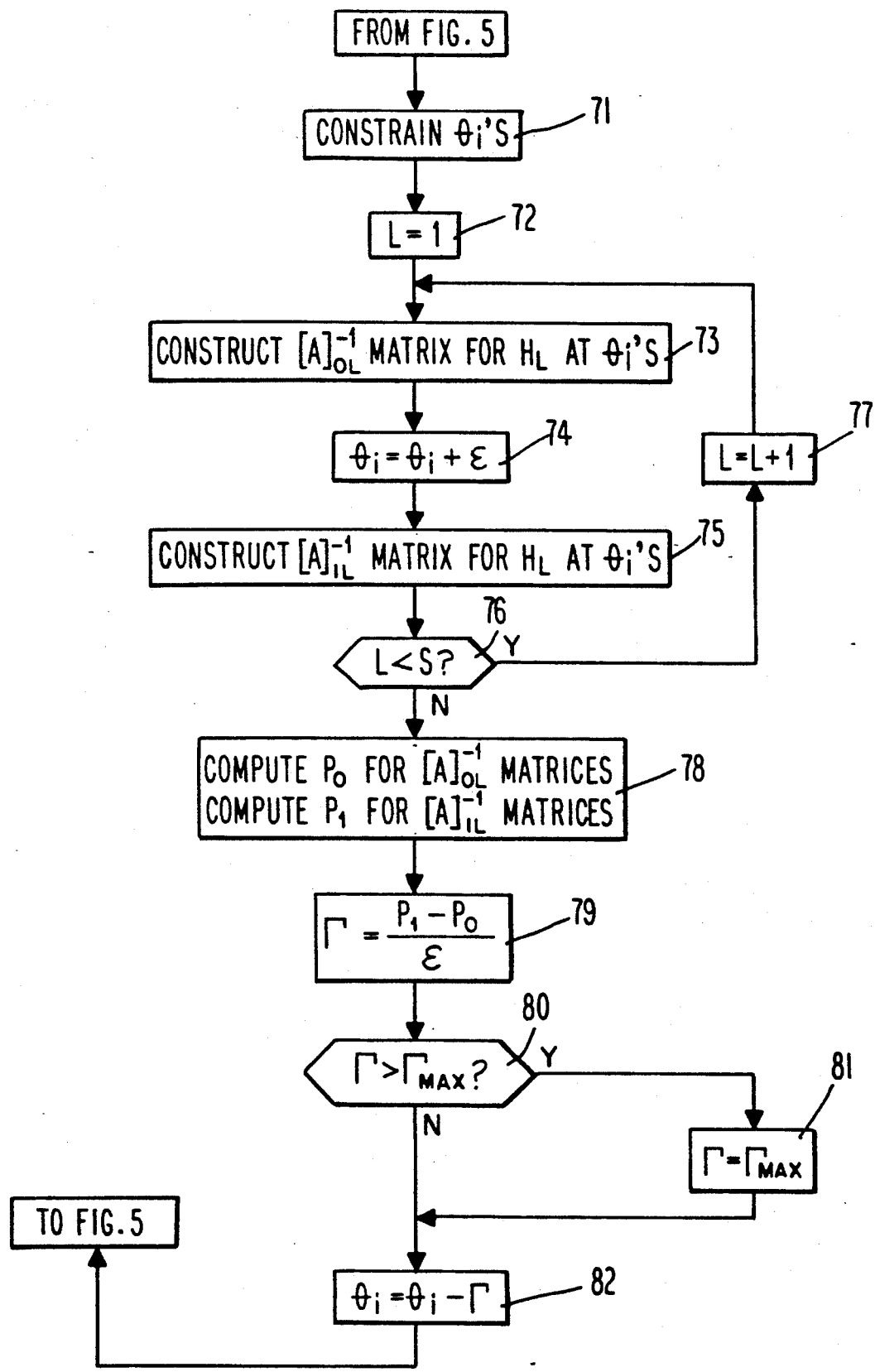

The steps required to optimize the sensor locations are shown in FIGS. 5 and 6. In step 60, the number M of harmonics $h_k$ to be included in each set of harmonics $H_L$—that is, the number of harmonics to be analyzed simultaneously —is selected. In step 61, the number of sensors N is determined based on the value of M selected in step 60. As previously discussed, the condition $N=2M+1$ must be satisfied to solve equation (9) for the displacement vector D. Hence, a limitation on the number of sensors which can be installed in the cylinder results in a restriction on the number of harmonics which can be simultaneously analyzed.

If one could be certain that vibration at only one harmonic would be present, then selecting $M=1$ would be advantageous since it would require the installation of only three sensors. However, since static and first harmonic deflection can be expected to be present, the zero and first harmonics should usually be included in the analysis. Thus, at least five sensors should optimally be used.

However, if, as is sometimes the case, the blade vibration were a composite of vibration at several harmonics, errors will result in the analysis if an insufficient number of harmonics are simultaneously analyzed. This occurs, because, using the analysis described below, the coefficients of the sine and cosine terms—that is, the value of $d_p$ in equation (7)—are solved so as to match as nearly as possible the actual waveform of the blade-tip displacement using only the selected harmonic frequencies. If there is significant vibration at non-selected harmonics, this vibration would erroneously appear in the amplitudes of the selected harmonic components. Hence, if the blade vibration were a composite of vibration at the third and fifth harmonics, and only one harmonic were analyzed at a time ($M=1$), the analysis of the third and fifth harmonics on an individual basis would not result in an accurate determination of the actual amplitudes of the components of vibration at either of these harmonics. Therefore, the number of harmonics to be simultaneously analyzed must be selected with care based on the vibration expected to be encountered—that is, the number of harmonics which will be present—and the difficulty of installing a large number of sensors. Moreover, the analysis should be repeated using several sets of harmonics and the results compared to determine the proper set of harmonics to be used in the analysis.

Note that only blade vibration at frequencies which are harmonics of the rotor rotational frequency has been discussed. It is recognized that the vibration may well be a composite of non-harmonic vibrations. However, it is not the purpose of the current invention to detect non-harmonic vibrations. Moreover, as explained below, such non-harmonic vibration is eliminated from the data by averaging.

In step 62, the sensor location constraints for the cylinder are determined. As previously discussed, sensor installation will be precluded in certain areas of the cylinder 7 as a result of limited access due to piping, flanges, etc. In addition, sensors should not be installed less then a certain minimum distance apart. Hence, $\theta_i$ will be constrained so as not to take on certain values. As previously mentioned, according to the current invention, the sensors need not be equally spaced around the cylinder 7. Hence, the constraints determined in step 62 could include the requirement that $\theta$ not have values between 90° and 270° (0° being at top dead center) so that all of the sensors would be located in the cover half 8 of the cylinder 7. These constraints are applied to values of $\theta_i$ in step 71, shown in FIG. 6.

In step 63, the number L of harmonic sets to be analyzed and the value of harmonics $h_k$ for each harmonic set $H_L$ are selected, keeping in mind that only M values of $h_k$ may be included in each set but that any number of harmonic sets may be selected. The values of $h_k$ chosen should be based on the expected harmonics. Generally, the first harmonic will always be present, hence it should be included in each set ($h_1=1$) unless one can be confident of its absence.

In steps 64–87, the optimum sensor locations are determined. In step 65, a trial set of $\theta_i$ are selected using a random number generator. Alternatively, a promising trial set of $\theta_i$ can be obtained by logarithmic spacing using the equation:

$$\theta_i = (2^{i/N}\theta_N)/2$$

where: $\theta_N$=the largest spacing between any two sensors.

In steps 72–77, shown in FIG. 6, two sets of discrete Fourier transform matrices $[A]_{0L-1}$ and $[A]_{1L-1}$, as expressed in equation (10), are constructed, one of each of these matrices being constructed for each harmonic set $H_L$ selected. Initially, the set of $[A]_{0L-1}$ matrices are determined for the trial set of $\theta_i$ chosen in step 65. The set of $[A]_{1L-1}$ matrices are determined for the same set of $\theta_i$ except that $\theta_1$, the location of sensor 1 (assuming the location of this sensor has not been locked, as determined in step 69), has been increased by $\epsilon$ in step 74. As previously discussed, the preferred value of $\epsilon$ is 0.05°. In step 79 value of the performance criteria $P_0$ and $P_1$ are determined for the $[A]_{0L-1}$ and $[A]_{1L-1}$ sets of matrices using equation (13). In step 79, the value of the gradient $\Gamma$ at the trial set of $\theta_i$ is approximated from equation (15). The value of $\Gamma$ is constrained in steps 80 and 81 so as not to exceed a maximum value $\Gamma_{max}$ in order to prevent instability in the procedure. As previously discussed the preferred value of $\Gamma_{max}$ is 0.1°.

In step 82 a new value of $\theta_i$ is determined by reducing it by the value of the gradient determined in step 79. Steps 71-82 are then repeated, this time determining a new value for $\theta_2$. In steps 68-70, steps 71-82 are repeated N number of times until a new value of $\theta_i$ has been calculated in step 82 for each sensor. In steps 83 and 84, steps 67-82 are repeated for Imax number of iterations, each iteration calculating a new set of $\theta_i$ by reducing each $\theta_i$ by the values of the gradient determined in step 82, as explained above. The inventors have determined that convergence can be obtained if Imax=500.

Note that due to the constraints applied in step 71, convergence does not imply that the gradient for each $\theta_i$ will be zero since the gradient may end up "pushing" against a constraint. Moreover, it should be realized that the method according to steps 65-84 may result in achieving only a local minimum in the performance criteria. Hence, in steps 85 and 86, steps 65-84 are repeated T number of times, using a new trial set of $\theta_i$ each time, thereby increasing the chances of finding a global minimum of the performance criteria. To this end, it is recommended that the gradient search be carried out at least three times (T=3).

In one sensor location optimization performed by the inventors, it was desired to avoid installing sensors in the base half of the cylinder. Hence, $\theta_i$ was constrained so as not to take on values from 180° to 360° (in this case 0° was taken as the left horizontal joint). In addition, it was determined that there was insufficient access to install a sensor in locations 10°-15° and 60°-65° in the cover half. Moreover, it was determined that sensors should not be installed within 3° of each other. All of these constraints were factored into the analysis. It was anticipated that eleven sensors would be required to accurately monitor vibration and two sets of harmonics were selected for analysis —$H_1$=1,5,6,7,8 and $H_2$=1,5,6,14,15. The sensor location optimization method was performed as discussed above using ten trial sets of $\theta_i$ and 500 iterations (Imax=500) and the gradient constrained to $\Gamma_{max}=0.1$. In this example, the optimum set of sensor locations was determined to be 0°, 10°, 24°, 45.5°, 66.8°, 86.8°, 113.2°, 125.9°, 140.7°, 169.7° and 180°.

Once the optimum set of sensor locations has been determined, the sensors are mounted in the cylinder 7 in step 88. A method of mounting the sensors is disclosed in U.S. Pat. No. 4,907,456, granted to Rozelle, and assigned to the same assignee as the current invention, which is hereby incorporated by reference.

Figure 7:
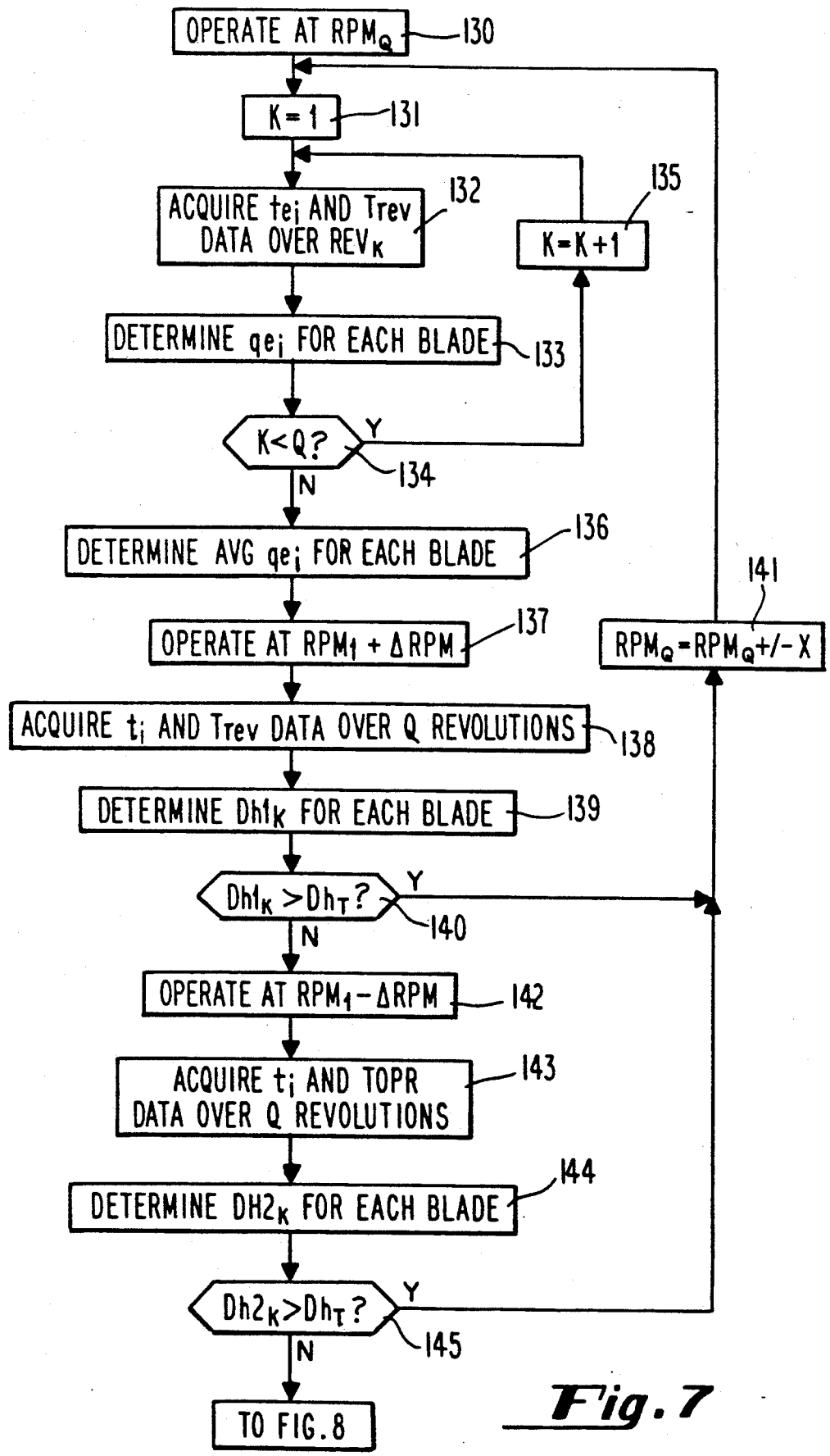

The standardization phase is carried out in steps 130-145, shown in FIG. 7. According to the current invention, $\theta_i$ is defined using actual blade arrival time data acquired when there is negligible blade vibration. Thus, in step 130 the rotor is operated at a "quiet" speed $RPM_Q$ at which negligible blade vibration occurs—the value of $RPM_Q$ will depend on the particular design of the blades being monitored (i.e., the natural frequency of the blades) and the sources of blade excitation existing in the particular turbo-machine in which the blades are operating. In step 132, the blade arrival time $te_i$ relative to the OPR event is detected for each blade at each sensor, along with the elapsed time Trev between successive OPR events over one revolution of the rotor. Since the blades are assumed to be undergoing negligible vibration at $RPM_Q$, as will be verified according to steps 137-144 discussed below, each blade-tip will be in its neutral position. Hence the blade arrival time $te_i$ is deemed the "expected" blade arrival time—that is, the arrival which would occur if the blade-tip were free from any vibratory deflection.

Note that each blade-tip undergoes a static deflection, due to centrifugal force and fluid loadings, which varies with rotor speed. If the data acquisition and standardization are conducted at the same speed, the static deflection will be the same for both and, therefore, not give rise to any deviation in the expected arrival time. Changes in the static deflection due to substantial differences in the standardization and data acquisition speeds will appear in the analysis results as a deflection component at the zero harmonic.

In step 133 the blade arrival time is normalized by expressing it as the fraction of a rotor revolution $qe_i$ associated with the arrival of each blade at each sensor from the equation:

$$qe_i = te_i/Trev \qquad (16)$$

Since the sensor locations can be defined as:

$$\theta_i = 2\pi te_i/Trev \qquad (17)$$

Substituting equation (16) into (17) yields:

$$\theta_i = 2\pi qe_i \qquad (18)$$

According to equation (18) the sensor location can be expressed in terms of the fraction of a rotor revolution associated with the arrival time of a blade at that sensor. Hence, according to the current invention, the blade arrival time is normalized by expressing it as a fraction of a rotor revolution $qe_i$ which can be used as a surrogate for the geometric location $\theta_i$ of the sensors. Note that if there are 100 blades in a row and seven sensors are utilized, 700 values of $qe_i$ will be determined for each revolution of the rotor.

According to an important aspect of the current invention, the acquisition of $te_i$ and Trev and the determination of $qe_i$ are performed for Q revolutions. A final value $qe_i$ for each blade at each sensor is determined in step 136 by averaging the $qe_i$ values over the Q revolutions. This averaging minimizes errors introduced as a result of non-synchronous vibration since any non-synchronous component of blade vibration will, by definition, result in a change in the blade-tip deflection detected at any given sensor between successive revolutions of the rotor. During some revolutions the arrival time will be increased as a result of the non-synchronous vibration, whereas during other revolutions the arrival time will be decreased. Thus, by averaging the blade arrival time data $qe_i$ the non-synchronous blade components are excluded from the analysis.

In steps 137-145, the appropriateness of $RPM_Q$ for the standardization phase is tested. As previously mentioned, the accuracy of the analysis will be impaired if standardization is carried out at a rotor speed at which there is significant synchronous vibration, since such vibration will result in an erroneous determination of the sensor locations as indicated by $qe_i$. The quietness of $RPM_Q$ is determined by acquiring data and calculating vibration components $Dh1_k$ and $Dh2_k$, as explained further below, at speeds slightly above and slightly below $RPM_Q$, respectively. Since, absent significant excitation, small changes in speed should not produce appreciable changes in vibration, in steps 140 and 145 vibration components $Dh1_k$ and $Dh2_k$ are compared to a predetermined vibration level $Dh_T$. If they exceed this level, $RPM_Q$ is deemed to be insufficiently quiet for standardization and a new $RPM_Q$ is selected in step 141 by making an incremental change X in the original $RPM_Q$. Steps 131-145 are then repeated. The inventors have found that a speed increment $\Delta RPM$ in step 137 and 142 of approximately 30 RPM is sufficiently great to test the quietness of the standardization speed, and that vibration components in excess of a 10 mil level indicates that the speed is not sufficiently quiet.

Figure 8:
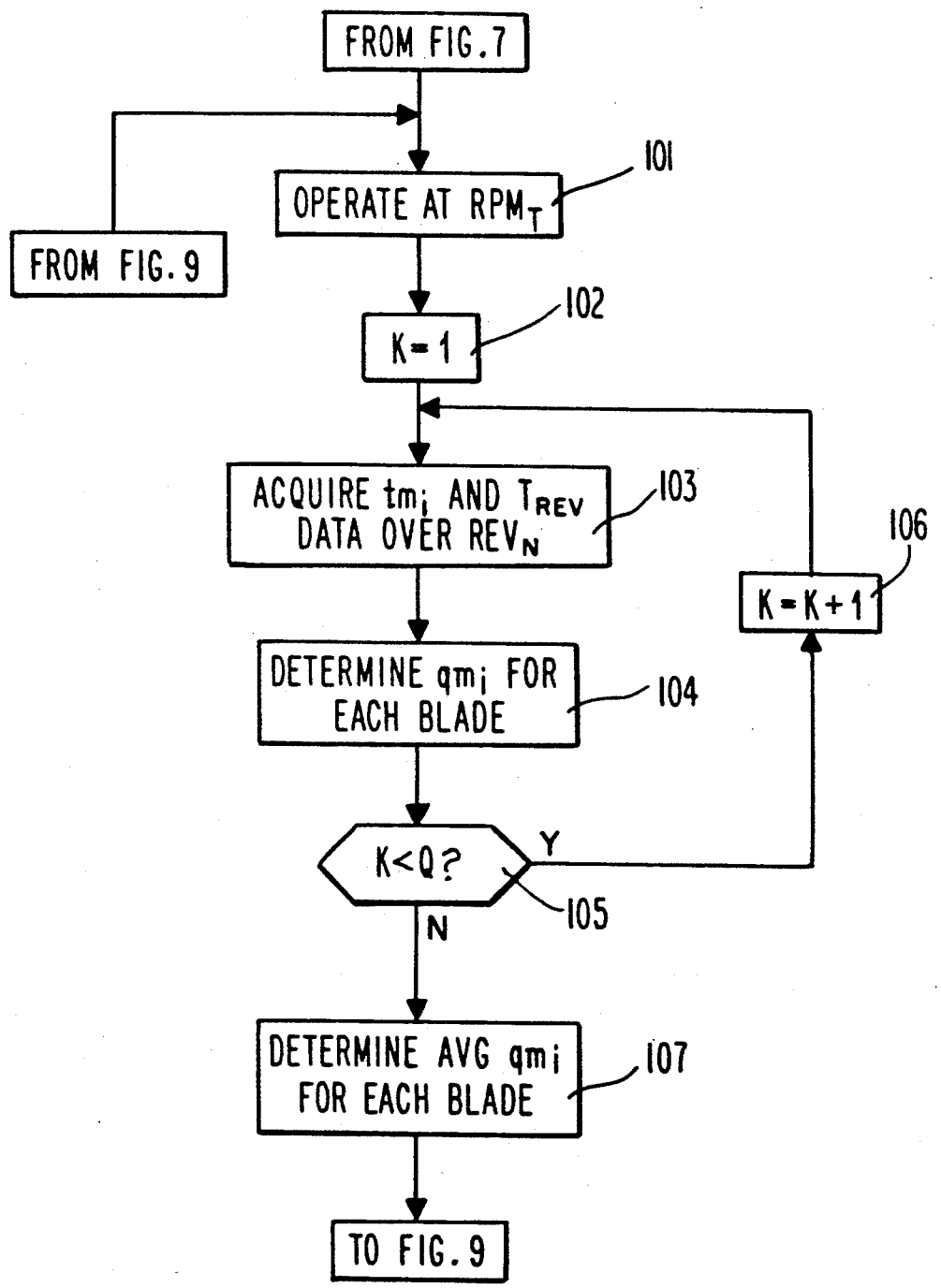

Data acquisition at the test speed $RPM_T$ at which the vibration analysis is to be carried out is performed in steps 101-107, as shown in FIG. 8. In step 103, the arrival time $tm_i$ of each blade at each sensor, along with Trev, are determined for each of Q revolutions. According to an important aspect of the current invention, the fraction of a rotor revolution q associated with the arrival of a blade at a sensor is used not only to determine sensor location $qe_i$ in the standardization phrase, as previously discussed, but is also relied on to express the actual blade arrival time $qm_i$ when the blade-tip is undergoing vibratory deflection. Thus, a value for $qm_i$ is calculated for each revolution by the equation $qm_i = t - m_i / Trev$.

The advantage of using the revolution fraction $qm_i$ rather than the measured time $tm_i$ itself is that $qm_i$ is normalized by the period Trev of the rotor revolution. Hence, slight variations in rotor speed during data acquisition will not influence the results. As in the standardization phrase, the values of $qm_i$ are averaged over Q revolutions to exclude the effects of non-synchronous vibration.

Figure 9:
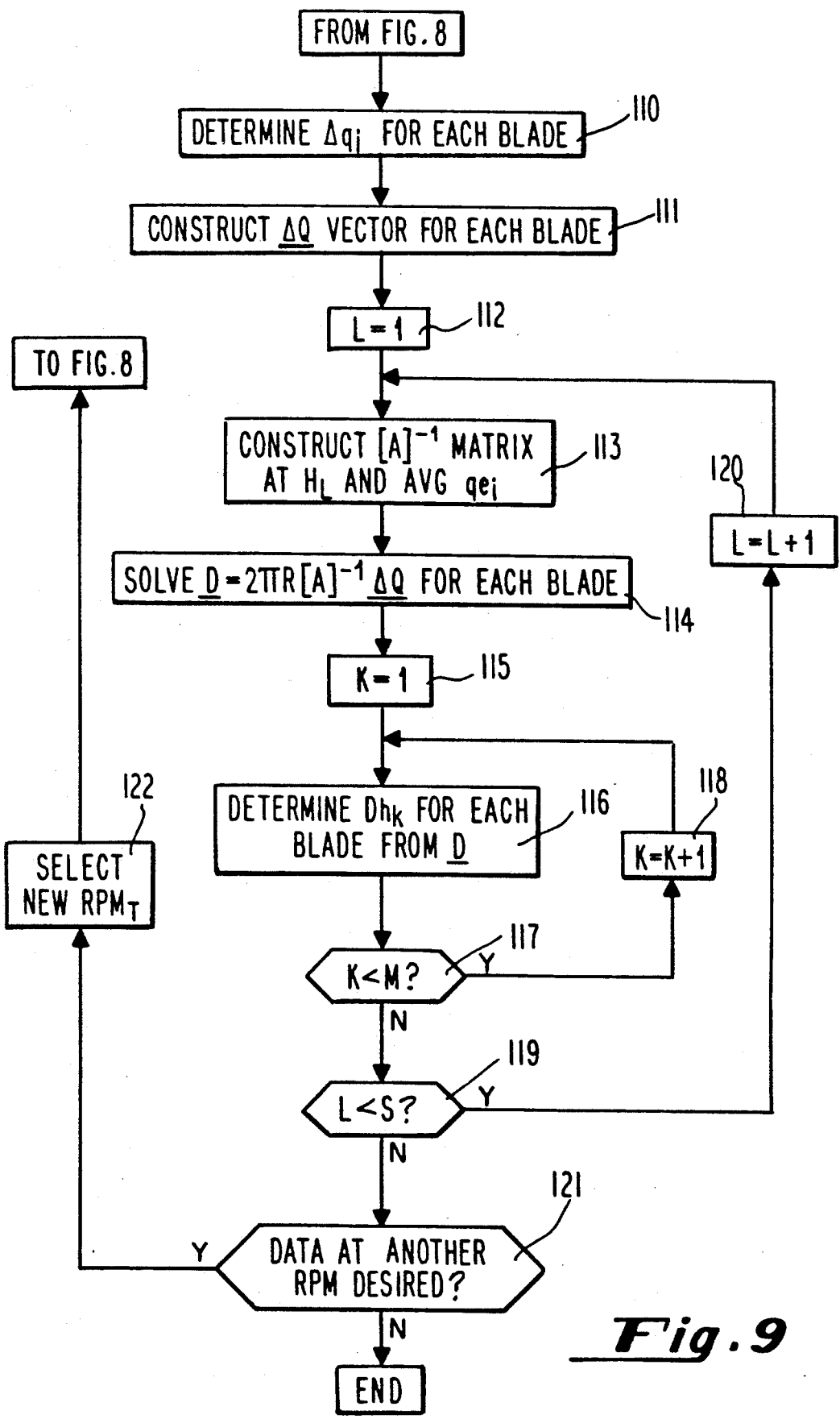

The vibration analysis is performed in steps 110-120, as shown in FIG. 9. Using the values of $qe_i$ from step 136 of the standardization phase and $qm_i$ from step 104 of the data acquisition phase, the deviation $\Delta t_i$ in the arrival time of each blade at each sensor from the expected arrival time, expressed as a fraction of a rotor revolution $\Delta q_i$, is calculated from:

$$\Delta q_i) = qm_{i-qei} \quad (19)$$

As previously discussed, the deviation $\Delta t_i$ (and its surrogate $\Delta q_i$ in the actual blade arrival time at any given sensor from its expected arrival time—that is, expected in the absence of vibration—is indicative of the blade-tip deflection at the sensor and hence, the blade vibratory amplitude.

In step 111, a $\Delta Q$ vector is constructed from the values of $\Delta q_i$ determined in step 110 for each sensor. Note that a separate $\Delta Q$ vector is constructed for each blade. From inspection of equation (16) it is apparent that:

$$\Delta t = Trev \, \Delta Q \quad (20)$$

Substituting equations (18) and (20) into equation (8) yields:

$$\Delta Q = [1/(2\pi R)][A]D \quad (21)$$

where:

$$a_{ij} = \begin{cases} \sin(2\pi h_k qe_i) & \text{for } j = 1, 3, 5, \ldots 2M-1 \\ \cos(2\pi h_k qe_i) & \text{for } j = 1, 3, 5, \ldots 2M \\ 1 & \text{for } j = 2M+1 \end{cases} \quad (22)$$

$k = [(j-1)/2] + 1$; truncated to integer values.

Note that the $2M+1$ column in the [A] matrix is a series of 1's, represeenting the static tip deflection, also referred to as the zero harmonic. Solving for the displacement vector D equation (21) becomes:

$$D = 2\pi R[A]^{-1} \Delta Q \quad (23)$$

Equation (23) is the practical form of the equation used to calculate the amplitude of the sine and cosine components of each harmonic. The $[A]^{-1}$ matrix is the discrete Fourier transform matrix for transforming the blade vibration waveform in the time domain (as indicated by the arrival time data) into the frequency domain. According to the current invention, the transform matrix may be expressed either in terms of the fractional rotor revolution $q_i$, or in terms of the sensor geometric location $\theta_i$. The transformation is limited to a frequency domain described by M predetermined harmonics $h_k$ (e.g., $h_k = 1,3,7$).

In step 113, the $[A]^{-1}$ transform matrix is constructed at the $qe_i$ values for each sensor determined in step 136 and the harmonic sets $H_L$ selected in step 63. In step 114, equation (23) is solved for the displacement vector D associated with each blade and harmonic set using the transform matrix $[A]^{-1}$ constructed in step 113 and the deviation in blade arrival time, expressed as a fraction of rotor revolution vector $\Delta Q$, determined in step 111. In steps 115-118, the amplitude of the component of blade vibration at each of the M harmonics $h_k$ selected in the $H_L$ set is calculated from equation (3). Note that steps 113-119 are repeated for each harmonic set $H_L$ selected in step 63, so that if ten harmonic sets are chosen for analysis (S=10), there will be ten distinct $[A]^{-1}$ transform matrices and ten sets of harmonic amplitudes for each blade. As indicated in step 122, the data acquisition and analysis phases can be repeated at other rotor speeds if desired.

A hypothetical set of vibration data for a single blade using an analysis based on four harmonics $h_k$ per harmonic set $H_L$ (M=4), and four different harmonic sets, is shown in Table I (units of the amplitude values are mils). The data for $h_0$ represents the static tip deflection from the last standardization point.

TABLE I

| Set | Harmonics, $h_k$ | Amplitudes $Dh_k$ at each harmonic | | | |
|---|---|---|---|---|---|
| | | $h_0$ | $h_1$ | $h_2$ | $h_3$ |
| 1 | 1,2,4 | 199 | 184 | 118 | 12 |
| 2 | 1,3,5 | 0 | 0 | 100 | 0 |
| 3 | 1,4,5 | 107 | 144 | 108 | 53 |
| 4 | 1,3,7 | 0 | 0 | 100 | 0 |

Unless the harmonics at which appreciable vibration will occur are known with certainty beforehand, a variety of harmonic sets must be chosen to properly analyze the data. Thus, although the data shown in Table I indicates high values at the zero and first harmonics when analyzed in the first and third harmonic sets, no deflection is indicated at these harmonics in the second and fourth harmonic sets. The fact that the first and third sets have large values at all of the harmonics in those sets indicates that the actual harmonic at which the blade was vibrating is not contained in those sets. The conclusion from Table I is that a third harmonic, 100 mil vibration is present.

Based on the amplitude of each harmonic component provided by the analysis, the vibratory stress on the blade can be calculated.

The present invention may be embodied in other specific forms without departing from the spirit or central attributes thereof, and accordingly, reference should be made to the appended claims, rather than to the foregoing specification, as indicating the scope of invention.

We claim:

1. A turbo-machine system comprising:
   (a) a turbo-machine having a rotor having:
      (i) a reference indicator,
      (ii) a periphery, and
      (iii) a plurality of blades spaced in a row around said periphery of said rotor, said blades having a radius R and being subject to vibration when said rotor rotates at a frequency of rotation, said vibration having components having an amplitude $Dh_k$ of vibration at a set H of M harmonics $h_k$ of said frequency of rotation of said rotor; and
   (b) a vibration monitor for monitoring said components of said vibration, said vibration monitor having:
      (i) N sensors for generating a signal at an actual arrival time when each one of said blades arrives at one of said sensors, said sensors circumferentially spaced about said blade row at a spacing between each of said sensors that is not limited to uniform spacing, N being equal to $2M+1$;
      (ii) means, responsive to said sensor signals, for generating data representative of said actual arrival time $tm_i$ of each of said blades sensed by each of said sensors;
      (iii) means for generating data representative of an expected arrival time $te_i$ at which each of said blades is expected to arrive at each of said sensors in the absence of said vibration;
      (iv) means for forming a vector $\Delta T$ from an equation $\Delta T = tm_i - te_i$; and
      (v) means for calculating values of elements $a_{ij}$ of a matrix $[A]$, having an inverse matrix $[A]^{-1}$, using equations:

$$a_{ij} = \begin{cases} \sin(2\pi h_k te_i) & \text{for } j = 1,3,5 \ldots 2M-1 \\ \cos(2\pi h_k te_i) & \text{for } j = 2,4,6 \ldots 2M \\ 1 & \text{for } j = 2M+1 \end{cases}$$

$k = [(j-1)/2] + 1$, truncated to integer values;

(vi) means for calculating said inverse matrix $[A]^{-1}$ of said $[A]$ matrix;
   (vii) means for calculating values of elements $d_p$ of a vector D from an equation $D = 2\pi R[A]^{-1}\Delta T$; and
   (viii) means for calculating said amplitude $Dh_k$ of said components of vibration at each of said harmonics $h_k$ in said set H from an equation $Dh_k = [d_{2k-1} + d_2k]^{\frac{1}{2}}$.

2. The turbo-machine system according to claim 1 wherein N is an integer equal to at least 3.

3. The turbo-machine system according to claim 1 wherein said vibration monitor further comprises means for normalizing said actual and said expected arrival time data $tm_i$ and $te_i$, respectively, for each revolution of said rotor.

4. The turbo-machine system according to claim 3 wherein said normalizing means comprises means for determining the period of time required for completion of one of said rotor revolutions and means for determining the fraction of said complete rotor revolution time represented by each of said actual arrival times.

5. The turbo-machine system according to claim 3, wherein said means for normalizing said actual and said expected arrival times $tm_i$ and $te_i$, respectively, each having means for normalizing said arrival times by expressing said arrival times as fractions $qm_i$ and $qe_i$, respectively, of the time required for a complete revolution of said rotor at said rotor rotational frequency.

6. The turbo-machine system according to claim 5, wherein:
   a) said means for forming said vector $\Delta T$, comprises means for forming a vector $\Delta Q$ from the equation $\Delta Q = qm_i - qe_i$;
   b) said means for calculating values of said elements $a_{ij}$ of said matrix $[A]$ has means for calculating said values using the equations:

$$a_{ij} = \begin{cases} \sin(2\pi h_k qe_i) & \text{for } j = 1, 3, 5, \ldots 2M-1 \\ \cos(2\pi h_k qe_i) & \text{for } j = 2, 4, 6, \ldots 2M \\ 1 & \text{for } j = 2M+1 \end{cases}$$

$k = [(j-1)/2] + 1$, truncated to integer values; and c) said means for calculating values of elements $d_p$ of said vector D has means for calculating said elements from an equation $D = 2\pi R[A]^{-1}\Delta Q$.

7. The turbo-machine system according to claim 1 wherein said means for generating actual arrival time data comprises a clock and a plurality of latches responsive to said sensor signals to latch the counter value of said clock.

8. The turbo-machine system according to claim 1 wherein said vibration monitor means further comprises a reference indicator formed on said rotor and an additional sensor for generating a signal when said reference indicator arrives at said additional sensor.

9. The turbo-machine system according to claim 1 wherein said means for generating expected arrival time data comprises means for determining said actual arrival time data at a quiet rotor speed.

10. The turbo-machine system according to claim 1, wherein said vibration monitor further comprising means for determining an optimum set of said circumferential spacing of said sensors about said blade row, said circumferential spacing determining means having means for determining said set of circumferential spacing that will result in a minimum value of the sum of the squares of said elements of said inverse matrix $[A]^{-1}$.

11. The turbo-machine system according to claim 1, wherein circumferentially spacing determining means has means for performing an iterative gradient search procedure.

12. In a turbo-machine having (i) a cylinder, (ii) a rotor having a periphery enclosed by said cylinder and rotating at a frequency, (iii) a plurality of blades arranged in a row about said periphery of said rotor and subject to vibration having components at harmonics of said rotational frequency of said rotor, a method for determining the amplitude of said components of said vibration for each of said blades at a set of said harmonics of said rotational frequency of said rotor, comprising the steps of:

(a) installing a reference indicator on said rotor;

(b) installing a first sensor for generating a signal when said reference indicator arrives at said first sensor;

(c) installing a set of N second sensors in said cylinder so as to be spaced circumferentially around said rotor, said spacing between said second sensors not being limited to uniform spacing, each of said second sensors having means for generating a signal when each one of said blades arrives at one of said sensors, N being an odd integer equal to at least 3;

(d) determining the angular location of each of said second sensors relative to said first sensor;

(e) selecting said set of harmonics, the number of harmonics in said set being equal to $\frac{1}{2}(N-1)$;

(f) rotating said rotor at a first speed, whereby each of said blades arrives at each of said second sensors and said reference indicator arrives at said first sensor, (g) determining arrival time data for each of said blades at each of said second sensors relative to an arrival time of said reference indicator at said first sensor;

(h) normalizing said arrival time data for each revolution of said rotor by sensing the period of time between two consecutive arrivals of said reference indicator at said first sensor and dividing said arrival times by said time period;

(i) determining the Fourier transform matrix for transforming said arrival time data into a frequency domain using said angular locations determined in step (d) and said set of harmonics selected in step (e);

(j) forming said arrival time data determined in step (g) into a vector and multiplying by said Fourier transform matrix determined in step (i) to arrive at a blade-tip displacement vector; and (k) determining said amplitudes of said components of vibration at said selected set of harmonics based on said blade-tip displacement vector.

13. The method according to claim 12 wherein the step of determining the angular location of each of said second sensors relative to said first sensor comprises the step of rotating said rotor at a second speed and determining the arrival time of each of said blades at each of said second sensors relative to the arrival time of said reference indicator at said first sensor as a fraction of the elapsed time between consecutive arrivals of said reference indicator at said first sensor.

14. The method according to claim 12 wherein the step of determining the arrival time of each of said blades comprises the step of sensing the arrival time of each of said blades for a plurality of revolutions and determining the average arrival time among said revolutions.

15. The method according to claim 12 when the step of determining said Fourier transform matrix and multiplying said matrix by said arrival time vector is performed by a microprocessor.

16. The method according to claim 12 wherein said arrival time data and said amplitude of said components of vibration each have a variance, and wherein the step of installing said set of N second sensors circumferentially around said rotor comprises the step of determining a set of locations for said second sensors which will result in the minimum variance in said amplitude of said components of vibration for said variance in said arrival time data.

17. The method according to claim 16 wherein the step of determining said second sensor locations comprises the further steps of:

(a) determining the locations around said rotor where there is sufficient access to locate one of said second sensors; and (b) determining said set of second sensor locations as constrained by said insufficient access locations.

18. The method according to claim 17 wherein the step of determining said set of second sensor locations comprises the steps of:

(a) constructing a performance criterion which represents the effect of said variance in said arrival time data on said variance of said amplitude of said components of vibration for a given one of said sets of second sensor locations; and (b) determining said set of second sensor locations which will result in a minimum value of said performance criterion.

19. The method according to claim 18 wherein the step of determining said set of second sensor locations which will result in a minimum value of said performance criterion is determined by a gradient search technique.

20. The method according to claim 18 wherein said performance criterion is equal to the sum of the squares of said elements of said Fourier transform matrix.

21. The method according to claim 12 further comprising the steps of selecting additional sets of harmonics, the number of harmonics in each of said additional sets being equal to $\frac{1}{2}(N-1)$, and repeating steps (d) through (f) for each of said additional harmonic sets.

22. A method for determining the amplitude $Dh_k$ of vibration of a member affixed to a rotor so as to rotate in a plane of rotation and subject to vibration at M harmonics $h_k$ of the frequency of rotation of said rotor, said rotor having a reference indicator, said member having a radius R, comprising the steps of:

(a) installing N sensors circumferentially located at angular locations about said plane of rotation of said member for generating a signal when said member arrives at said sensor location, N being an odd integer equal to at least 3;

(b) determining said angular location $\theta_i$ of each of said sensors;

(c) selecting a set H of M harmonics $h_k$ of rotor rotational frequency to be analyzed, M being related to the number of sensors by an equation $M = \frac{1}{2}(N-1)$;

(d) calculating the values of elements $a_{ij}$ of a matrix, having an inverse matrix $[A]^{-1}$, using said values of $\theta_i$ and $h_k$ from steps (b) and (c), respectively, using equations:

$$a_{ij} = \begin{cases} \sin(2\pi h_k q e_i) & \text{for } j = 1, 3, 5, \ldots 2M - 1 \\ \cos(2\pi h_k q e_i) & \text{for } j = 2, 4, 6, \ldots 2M \\ 1 & \text{for } j = 2M + 1 \end{cases}$$

$k = [(j-1)/2] + 1$, truncated to integer values;

(e) calculating said inverse $[A]^{-1}$ matrix of said $[A]$ matrix determined in step (d);

(f) rotating said shaft at a speed so that each of said member arrives at each of said sensors;

(g) sensing arrival times of said member at each of said sensors and expressing said arrival times as a fraction $qm_i$ of the time required for a complete revolution of said rotor at said speed and forming a vector $\Delta Q$ from said $qm_i$ values;

(h) calculating values of elements $d_p$ of a vector D from an equation $D = 2\pi R[A]^{-1}\Delta Q$; and (i) calculating said amplitude $Dh_k$ of said components of vibration at each of said harmonics $h_k$ in said set H from an equation $Dh_k = [d_{2k-1} + d_{2k}]^{\frac{1}{2}}$.

23. In a turbo-machine having (i) a rotor having a periphery and adapted to rotate at a rotational frequency, (ii) a plurality of blades affixed to the periphery of said rotor and subject to vibration having components at harmonics of said rotational frequency of said rotor, (iii) a housing enclosing said rotor, and (iv) a vibration monitor for determining said components of said vibration and having N sensors for sensing data representative of said vibration, said sensor data being subject to errors, a method of installing said sensors around said housing so as to minimize the effect of said errors on said components of vibration as determined by said vibration monitor, comprising the steps of:

(a) determining circumferential locations on said housing where there is insufficient access to allow one of said sensors to be installed;

(b) determining a set of circumferential locations of said sensors which will result in a minimum propagation of said errors in said sensor data into said components of vibration determined by said vibration monitor, said circumferential locations being constrained so as not to fall in said insufficient access locations determined in step (a); and (c) installing said sensors in said set of locations determined in step (b).

24. The method according to claim 23 wherein the step of determining the set of circumferential locations of said sensors comprises the steps of:

(a) constructing a Fourier transform matrix for said vibration data sensed at said locations; and (b) determining said circumferential locations which will result in the sum of the squares of the elements of said Fourier transform matrix being at a minimum.

25. The method according to claim 24 wherein the step of determining said circumferential locations which will result in said minimum sum of squares is accomplished using an iterative gradient search procedure.

* * * * *